Patented Apr. 16, 1946

2,398,479

UNITED STATES PATENT OFFICE 2,398,479

PREPARATION OF ORGANIC SULPHUR COMPOUNDS

William E. Vaughan and Frederick F. Rust, Berkeley, Calif., assignors to Shell Development Company, San Francisco, Calif., a corporation of Delaware No Drawing. Application March 28, 1941, Serial No. 385,701

11 Claims. (Cl. 204—158)

The present invention relates to a process for the preparation of organic sulphur compounds, and more particularly to the preparation of mercaptans and/or thio-ethers by reacting hydrogen sulphide with symmetrical or unsymmetrical organic compounds containing unsaturated linkages of aliphatic character. In one of its more specific embodiments, this invention pertains to a novel method of effecting a controlled reaction reaction between hydrogen sulphide and unsymmetrical organic compounds containing at least one unsaturated linkage of aliphatic character, i. e. a double or triple bond, to produce addition products of a predetermined character.

This invention provides a practical and economical method for the utilization of hydrogen sulphide to effect the conversion of olefinic compounds, particularly those contained in or derived from petroleum and/or petroleum products, such as olefins, poly-olefins and olefin polymers, as well as of substituted derivatives thereof, such as unsaturated organic alcohols, ethers, esters, and the like, having at least one olefinic linkage, to valuable addition products thereof. The specific conditions under which the present invention is to be executed will be dependent in part upon the nature of the addition compound desired as the main reaction product. For example, a suitable unsaturated compound may be reacted with hydrogen sulphide under such conditions that the olefinic bond is saturated by hydrogen sulphide resulting in a product predominating in or consisting substantially solely of the corresponding mercaptan. In the alternative, the reaction may also be effected under such conditions, for example, by having the reactants in such relative amounts that the main reaction product is the corresponding thio-ether. The reaction may also be executed so that the reaction product contains a mixture of mercaptans and thio-ethers.

It is known that mercaptains and thio-ethers may be produced by subjecting mixtures of hydrogen sulphide and unsaturated organic compounds, e. g. unsaturated hydrocarbons, to elevated temperatures in the neighborhood of from 200° C. to 750° C. In some instances, such reactions were effected at superatmospheric pressures. When the reactions are effected at such temperatures and pressures, the sulphhydryl group attaches to the unsaturated carbon atom containing the lesser number of hydrogen atoms attached thereto. In other words, as is clearly brought out by Jones and Reid (Jour. Amer. Chem. Soc., vol. 60, pp. 2452–2455), the addition takes place according to Markownikoff's rule. Therefore, when terminally unsaturated olefins are thus reacted with hydrogen sulphide, the reaction product predominates in secondary mercaptans and/or secondary thio-ethers.

It has now been discovered that unsaturated organic compounds of the class more fully described hereinbelow may be reacted with hydrogen sulphide to effect rapid, efficient and directional conversion to mercaptans and/or thio-ethers. This conversion occurs via the so-called "abnormal" addition, i. e. contrary to the course suggested by the Markownikoff rule. According to the process of the present invention, the abnormal addition of hydrogen sulphide to the unsaturated organic compounds may be effected in the absence of free oxygen, air, ozone, peroxides, and, in fact, in the absence of any compound or substance the presence of which was heretofore considered or deemed necessary for promoting, sensitizing or catalyzing the aforementioned abnormal addition of hydrogen sulphide to unsaturated organic compounds. Furthermore, contrary to the teachings of the prior art, such conversion of unsaturated organic compounds to the corresponding mercaptans and/or thio-ethers may be effected without the necessity of resorting to high temperatures and elevated pressures heretofore deemed essential to promote or effect the desired reaction.

Broadly stated, the present invention resides in a photo-chemical process of effecting the addition of hydrogen sulphide under the deliberate influence of ultra-violet radiation, this reaction being effected at normal temperatures, i. e. in the neighborhood of about 25° C. to about 15° C., or even at considerably lower temperatures. More particularly stated, the reaction is effected under the influence of light rays having a wavelength of below about 2900 to 3000 A. U. (Angstrom units). It has been still further discovered that these light rays strongly catalyze the photo-chemical addition of hydrogen sulphide, this addition being preponderantly, if not wholly, contrary to the course suggested by Markownikoff for the addition of hydrogen halides, and in accordance with the rule proposed by Posner (Berichte, 38, 646 (1904)) concerning the addition of mercaptans to double bonds, namely, that the sulphur of the mercapto group normally becomes attached to the carbon atom holding the most hydrogen atoms. Therefore, the photochemical reaction taking place under the deliberate influence of ultra-violet radiations offers a direct method for obtaining primary mercaptans and/or primary thio-ethers from hydrocarbons containing a terminally unsaturated carbon atom.

Although there is no intention of being limited by any theory of the case, it is believed at the present time that the reaction occurs in accordance with the following or some similar reaction chain mechanism which is initiated by the ultraviolet radiations. For example, the mercaptans may be formed according to the following mechanism:

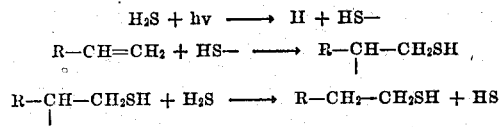

etc., wherein the dash sign (—) denotes a free valance, while R represents any organic radical. Similarly, thio-ether formation may occur in accordance with the above mechanism followed by:

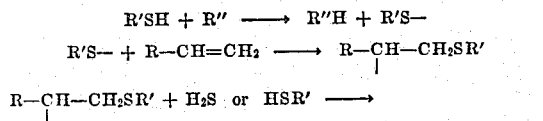

etc. Depending on whether the reactants contain a molal excess of hydrogen sulphide or of the unsaturated organic compound, the reaction products will thus predominate in either the mercaptans or thio-ethers, respectively.

The unsaturated organic compounds which may be reacted with hydrogen sulphide according to the invention include hydrocarbons which contain one or more olefinic and/or acetylenic linkages. Examples of such hydrocarbons are ethylene, propylene, butene-1, butene-2, isobutylene, the amylenes, hexene-1, 4-methyl-pentene-1, 4,4-dimethyl-pentene-1, 4-methyl-pentene-2, octene-1, decene-1, cetene-1, styrene, cyclohexene, 3-methyl-cyclohexene, 1,4-diphenyl butene-2, butadiene-1,3, pentadiene-1,3, pentadiene-1,4, hexadiene-1,5, hexadiene-1,4, acetylene, propyne, butyne-1, pentyne-2, hexyne-1, cetyne-1, octyl-acetylene, phenyl acetylene, etc., and their homologues and analogues. The above compounds, and their various homologues, may be substituted in the nucleus and/or in the substituents in various degrees by straight-chain, cyclic and/or heterocyclic radicals, and by such substituents as alkoxy, alkenoxy, alkyloxy, aralkoxy, alkylimido, etc. As examples, reference may be made to methyl acrylate, methyl methacrylate, divinyl ether, diallyl ether, dimethallyl ether, allyl alcohol, and the like.

The invention is particularly applicable to the reaction of hydrogen sulphide with unsaturated organic compounds, and especially unsaturated hydrocarbons, which have a terminal aliphatic unsaturated linkage. When such unsaturates are reacted with hydrogen sulphide according to the process of the present invention, i. e. photochemically and under the influence of ultra-violet radiations, the reaction product predominates in or consists of primary mercaptans and/or primary thio-ethers.

Another group of unsaturated organic compounds which may be employed as the primary material comprises or includes aliphatic hydrocarbons and their products of substitution which contains a plurality of unsaturated olefinic and/or acetylenic linkages, and particularly unsaturated compounds containing unsaturated linkages in alpha and omega positions (i. e. in terminal positions). Because of the fact that the addition of hydrogen sulphide to unsaturated organic compounds, when effected photo-chemically and under the influence of ultra-violet radiations, is via the so-called abnormal addition discussed above, the sulphhydryl radicals will attach to the terminal carbon atoms which carry the greatest number of hydrogen atoms. When unsaturated compounds containing double or triple bonds both in alpha and omega positions are thus treated, the reaction product contains primary di-mercaptans. These in turn react with additional molecules of the unsaturated compound to produce primary thio-ethers possessing a high molecular weight. For example, hydrogen sulphide may be readily reacted with hexadiene-1,5 to produce di-mercaptans, mercapto thio-ethers and polythioethers having the general formula

wherein each R represents a constituent which may be a hydrogen atom, a hexenyl radical, or a mercapto or thio-ether derivatives of hexadiene. Similarly, diallyl ether may be reacted with hydrogen sulphide to produce high molecular weight compounds which contain both ether oxygen atoms and thio-ether sulphur atoms in the chain. Instead of employing aliphatic straight chain polyunsaturated hydrocarbons, it is also possible to use branched chain hydrocarbons as well as compounds containing alicyclic, aryl, aralkyl and similar radicals, provided such compounds contain at least one unsaturated linkage of aliphatic character. In order to produce the above described high molecular weight compounds, the unsaturated compounds to be treated in accordance with the process of this invention should have at least two such unsaturated linkages of aliphatic character, which, as stated, should be preferably in alpha-omega (i. e. terminal) positions. However, other poly-unsaturated organic compounds may be used to produce branched-chain compounds having high molecular weights.

The reaction of hydrogen sulphide with the above-defined class of unsaturated organic compounds under the influence of ultra-violet radiations may be effected in the vapor or liquid phase, or in a two-phase liquid-vapor system. Since the abnormal addition of the hydrogen sulphide according to the present process occurs photochemically, no heating is necessary. In fact, although the reaction may be realized at atmospheric temperatures (i. e. between about 15° C. and about 25° C.), it may frequently be effected at temperatures as low as 0° C., and even considerably below this temperature, e. g. —75° C. and below. Although the photo-chemical reaction may be effected at any pressure, it is preferred to employ superatmospheric pressures which are at least sufficient to maintain the reactants in a liquid phase. This is because the conversion rate appears to be accelerated when the reaction is effected in the liquid state.

Although the reaction descried herein may be promoted by using the whole range of ultra-violet radiation, the most effective wave-lengths of light which promote the desired "abnormal" addition of hydrogen sulphide appear to lie in that portion of the spectrum which is below about 3200 Angstrom units, and more particularly in the region of about 2900 Angstrom units and below. In fact, the interposing of an ordinary window glass filter (which has a lower limit of transmission of about 3300 A. U.) or of a Pyrex glass filter having a lower transmission limit of about 2900 to 3000 A. U., in the path of light coming from a source emitting ultra-violet radiations, will cause a substantially complete inhibition of the reaction unless some sensitizer, such as the organic peroxides, is added. On the other hand, the use of quartz vessels for the reaction according to the present invention allows efficient addition of hydrogen sulphide due to the fact that quartz transmits ultra-violet rays considerably below 2900 Angstrom units.

The addition of hydrogen sulphide to unsaturated organic compounds occurs very rapidly when effected under the influence of ultra-violet rays, particularly when low boiling unsaturated hydrocarbons are thus treated in the liquid phase and when low wave-length rays of about 2900 A. U. and below are employed. In some cases, however, there is an initial induction period during which no or substantially no reaction occurs. This is particularly true when vapor phase reactions are effected, especially in the presence of certain impurities which adversely affect the reaction rate. The length of the induction period, if any, varies depending on a number of conditions, such as the specific reactants employed, presence or absence of a liquid phase, the concentration of the reactants in the reaction zone, presence or absence of impurities and/or added surfaces in the reaction zone, etc. Also, other conditions being equal, a change in the intensity of the effective wave-lengths of the ultra-violet radiation will vary the rate of the "abnormal" addition of the hydrogen sulphide and the production of mercaptans and/or thio-ethers.

The reaction may be effected in a batch, intermittent or continuous manner. When effected by a batch method, the reactants may be conveyed into a suitable container which is then illuminated with ultra-violet light for a period of time sufficient to effect the desired addition reaction. Since ordinary glass or Pyrex glass will not permit the substantial transmission of the effective light waves, namely those in the neighborhood of 2900 to 3000 Angstrom units and below, it is preferable to construct the container of quartz or other suitable light transmitting materials, e. g. calcium fluoride, or at least to provide such container with an opening or window of quartz, calcium fluoride, or the like, through which the interior may be illuminated with ultra-violet rays. In case of a continuous process, the reactants, viz. hydrogen sulphide and the unsaturated organic compound, such as an aliphatic terminally unsaturated hydrocarbon, may be conveyed, either in a liquid or vapor state, or both, through the interior of a reaction chamber. This chamber may be of sufficient length so as to permit adequate residence time for the reactants. The reactants in the reaction chamber are then subjected to ultra-violet radiations emanating from a source or sources disposed within or without the chamber. In the former case, the reactor may be constructed of steel or the like, the source of the ultra-violet radiations being disposed in the path of the moving reactants. The discharged reaction products may then be treated by any known or suitable means or methods for the separation of the desired mercaptans and/or thio-ethers from the unreacted material.

The invention is illustrated by the following specific examples, it being understood that there is no intention to be limited by any details thereof, since many variations may be made.

*Example I*

Substantially pure butene-1 was first prepared by conveying normal butyl alcohol over activated alumina maintained at between about 375° C. and 400° C. The resulting product was then carefully fractionated, degassed and re-fractionated to separate substantially pure butene-1 from other gases formed as the result of the above dehydrogenation of the alcohol.

Approximately 0.045 mol of the above butene-1 and about 0.09 mol of pure hydrogen sulphide were introduced into a quartz reaction tube having a 10 mm. internal diameter. The tube was then sealed and illuminated with a quartz mercury arc lamp for approximately four minutes, the tube and the reactants therein being maintained at a temperature of about 0° C. After the termination of the illumination, the reaction mixture was chilled by immersing the tube in solid carbon dioxide. The tube was then opened and the unreacted materials were allowed to evaporate. The remaining product (which amounted to about 3.8 cubic centimeters and consisted of a mixture of n-butyl mercaptan and di-normal butyl thio-ether) was then mixed with a large excess of a 10% aqueous sodium hydroxide solution. The mixture was then allowed to stand and the upper or supernatant layer was then separately recovered. This fraction, equal to about 0.5 cc. (about 0.003 mol) was found to be substantially pure di-normal butyl thio-ether having a refractive index $n_D^{20}=1.4530$. The alkaline solution was acidified with hydrochloric acid to regenerate the mercaptans. This regenerated product (which was recovered in an amount equal to 0.035 mol) was analyzed and showed a boiling point of 98.0° C. and a refractive index $n_D^{20}=1.4431$.

From the above it is seen that a four-minute illumination of the mixture of butene-1 and hydrogen sulphide with ultra-violet rays effected a 90% conversion of the butylene into sulphur-containing organic compounds, and that the reaction mixture consisted of substantially pure n-butyl mercaptan and di-normal butyl thio-ether in the mol ratio of about 12 to 1.

*Example II*

Pure butene-1 and hydrogen sulphide, employed in the same proportions as above, were subjected to ultra-violet rays in the same apparatus and under identical conditions as those employed in Example I, with the exception that the reactants were maintained at a temperature of about −78° C. while being subjected to illumination by rays from the quartz mercury arc lamp. The reaction product was treated in the same manner as in the previous example. It was found that about 40% to 45% of the butene reacted with the hydrogen sulphide to produce a mixture which predominated in n-butyl mercaptan and only a relatively small percentage (about 5%) of n-butyl sulphide (di-normal butyl thio-ether).

*Example III*

A gas phase hydrogen sulphide addition reaction was effected by introducing butene-1 and hydrogen sulphide into a quartz reactor which was first subjected to a high vacuum to remove substantially all of the gases therefrom. The butene-1 gas was introduced until the pressure in the container was equal to 100 mm. of mercury pressure, hydrogen sulphide being then added until the pressure rose to about 300 mm. of mercury pressure. The reactants were then subjected at a temperature of about 20° C. to ultra-violet radiation from a quartz mercury lamp, the reaction being continued for a period of about three hours. During this time the pressure in the container dropped to about 200 mm. of mercury pressure, thus showing that rays of short wave-lengths were sufficient to promote vapor phase addition of hydrogen sulphide. The reaction products consisted predominantly of n-butyl mercaptan and di-normal butyl thio-ester.

Example IV

In order to prove that the ultra-violet radiations of below about 3000 A. U. promote the abnormal reaction between hydrogen sulphide and unsaturated organic compounds having an unsaturated linkage of aliphatic character, butene-1 and hydrogen sulphide were introduced into a one-liter container made of Pyrex glass. The quantities of the reactants employed were substantially similar to those used in Example III. The mixture was then illuminated for about two hours by means of radiations emanating from a quartz mercury lamp. It was found, however, that no reaction occurred, thus indicating that radiations transmitted by Pyrex glass do not promote the reaction.

Example V

A liquid phase reaction between propylene and hydrogen sulphide was effected by introducing the reactants in volumetrically equal amounts (about 6.5 cc. of each substance) into an evacuated quartz tube, which was then sealed and illuminated for about six minutes by means of a quartz mercury arc lamp. The reactants in the quartz tube were maintained at a temperature of about 0° C. An analysis of the reaction mixture showed that about 95% of the propylene reacted with the hydrogen sulphide. The reaction product consisted of about 65% n-propyl mercaptan and about 35% di-n-propyl thio-ether, these percentages being by weight. The mercaptan boiled at about 67.5° C. and had a refractive index of $n_D^{20}=1.4351$. The thio-ether had an index $n_D^{20}=1.4493$, and boiled at about 142.8° C. This clearly indicates that the reaction products were substantially pure n-propyl mercaptan and di-n-propyl thio-ether, respectively.

Under similar conditions methyl acrylate was reacted with hydrogen sulphide under the influence of ultra-violet radiations to produce the methyl ester of beta-thiol propionic acid

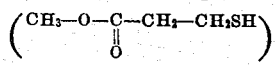

and the thio-ether thereof. Also, by subjecting a mixture of allyl alcohol and hydrogen sulphide to the photo-chemical treatment according to the process of the present invention, it was possible to produce 3-mercapto-propanol-1, and the corresponding thio-ether.

We claim as our invention:

1. In a process of producing addition compounds of the class consisting of n-butyl mercaptan and di-normal butyl thio-ether, the steps of reacting butene-1 with hydrogen sulphide, maintaining the reactants in a liquid state and at a temperature not in excess of 25° C., and effecting the reaction under the influence of light rays having wave-lengths below 3000 Angstrom units.

2. In a process of producing addition compounds of the class consisting of mercaptans and thio-ethers, the steps of reacting allyl alcohol with hydrogen sulphide, maintaining the reactants in a liquid state and at a temperature not in excess of 25° C., and effecting the reaction under the influence of light rays having wave-lengths below 3000 Angstrom units.

3. In a process of producing addition compounds containing at least two sulphur atoms per molecule, the steps of reacting hexadiene-1,5 with hydrogen sulphide, maintaining the reactants in a liquid state and at a temperature not in excess of 25° C., and effecting the reaction under the influence of light rays having wave-lengths below 3000 Angstrom units.

4. In a process of producing addition compounds predominating in mercaptans, the steps of mixing an alpha-unsaturated aliphatic hydrocarbon with a molal excess of hydrogen sulphide, maintaining the reactants in a liquid state and at a temperature not in excess of 25° C., and effecting the reaction under the influence of light rays having wave-lengths below 3000 Angstrom units.

5. In a process of producing addition compounds predominating in thio-ethers, the steps of mixing hydrogen sulphide with a molal excess of an alpha-unsaturated aliphatic hydrocarbon, maintaining the reactants in a liquid state and at a temperature not in excess of 25° C., and effecting the reaction under the influence of light rays having wave-lengths below 3000 Angstrom units.

6. In a process of producing addition compounds of the class consisting of mercaptans and thio-ethers, the steps of reacting hydrogen sulphide with an alpha-unsaturated aliphatic hydrocarbon, maintaining the reactants in a liquid state and at a temperature not in excess of 25° C., and effecting the reaction under the influence of ultra-violet radiations having wave-lengths of below 3000 Angstrom units.

7. In a process of producing addition compounds of the class consisting of mercaptans and thio-ethers, the steps of contacting hydrogen sulphide with an organic compound containing terminal unsaturated linkages of aliphatic character, maintaining the reactants in a liquid state and at a temperature not in excess of about 25° C., and subjecting the reactants to light rays having wave-lengths of below 3000 Angstrom units.

8. The process according to claim 7, wherein the reaction is effected at a temperature between about 0° C. and about 25° C.

9. In a process of producing addition compounds of the class consisting of mercaptans and thio-ethers, the steps of mixing hydrogen sulphide with an organic compound containing an unsaturated linkage of aliphatic character in alpha-position, maintaining the reactants in a liquid state and at a temperature not in excess of about 25° C., and subjecting the reactants to light rays having wave-lengths of below 3000 Angstrom units.

10. In a process of reacting unsaturated organic compounds with hydrogen sulphide to produce addition compounds of the class consisting of mercaptans and thio-ethers, the steps of contacting an organic compound containing at least one unsaturated linkage between two carbon atoms of aliphatic character with hydrogen sulphide, maintaining the reactants at a temperature not in excess of about 25° C., and subjecting the reactants to the influence of ultra-violet rays having wave-lengths of below 3000 Angstrom units.

11. In a process of effecting a photo-chemical reaction between hydrogen sulphide and unsaturated organic compounds to produce addition compounds of the class consisting of mercaptans and thio-ethers, the steps of reacting an unsymmetrical unsaturated organic compounds containing an unsaturated linkage between two carbon atoms of aliphatic character with hydrogen sulphide, maintaining the reactants at a temperature not in excess of about 25° C., and subjecting the reactants to the influence of ultra-violet radiations having wave-lengths of below 3000 Angstrom units.

WILLIAM E. VAUGHAN.
FREDERICK F. RUST.